United States Patent
Bansal et al.

(10) Patent No.: US 10,560,839 B1
(45) Date of Patent: Feb. 11, 2020

(54) SYSTEM AND METHOD FOR MOBILE ALIAS IDENTIFICATION

(71) Applicant: Polaris Wireless, Inc., Mountain View, CA (US)

(72) Inventors: Ankit Bansal, Bangalore (IN); Ravi Gyani, Bangalore (IN); Karthik Shashiraj, Bengaluru (IN); Arijit Mukherjee, Bangalore (IN)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

(21) Appl. No.: 16/286,488

(22) Filed: Feb. 26, 2019

(51) Int. Cl.
| | |
|---|---|
| *H04W 12/00* | (2009.01) |
| *H04W 8/02* | (2009.01) |
| *H04W 4/021* | (2018.01) |
| *H04L 29/12* | (2006.01) |
| *H04W 8/18* | (2009.01) |
| *H04W 64/00* | (2009.01) |
| *H04W 12/12* | (2009.01) |
| *H04W 60/00* | (2009.01) |

(52) U.S. Cl.
CPC ..... *H04W 12/00514* (2019.01); *H04L 61/308* (2013.01); *H04W 4/021* (2013.01); *H04W 8/02* (2013.01); *H04W 8/18* (2013.01); *H04W 12/00503* (2019.01); *H04W 12/1206* (2019.01); *H04W 64/003* (2013.01); *H04W 60/00* (2013.01)

(58) Field of Classification Search
CPC ....... H04W 12/00514; H04W 12/1206; H04W 12/00503; H04W 4/021; H04W 8/02; H04W 8/18; H04W 64/003; H04W 60/00; H04L 61/308
See application file for complete search history.

(56) References Cited

U.S. PATENT DOCUMENTS

| | | | |
|---|---|---|---|
| 8,489,596 B1 * | 7/2013 | Milton | G06Q 30/02 707/735 |
| 10,248,711 B2 * | 4/2019 | Abrahams | G06F 16/283 |
| 10,248,728 B1 * | 4/2019 | Ledet | G06Q 30/0633 |
| 2014/0038553 A1 * | 2/2014 | Gordon | H04L 67/18 455/410 |

(Continued)

FOREIGN PATENT DOCUMENTS

JP    2015049681 A  *  3/2015

OTHER PUBLICATIONS

Editorial Staff, "How to Find out if your Husband has a Secret Cell Phone Number," https://phonetipstricks.com/how-to-find-out-if-your-husband-has-a-secret-cell-phone/, Jan. 10, 2018.

(Continued)

*Primary Examiner* — Matthew C Sams
(74) *Attorney, Agent, or Firm* — McGeary Cukor LLC; Vincent McGeary; Jason Paul DeMont

(57) ABSTRACT

A system and method according to the principles of the invention identifies mobile phone aliases. The system processes mobile location data and call event data to generate mobility profiles. The profiles indicate a mobile's geographic zone history over a specified time. To produce a mobility profile, the system aggregates location data into zones and associates the zones with times of day, week or month. Particular zones for different mobiles can be compared according to weighting algorithms to provide data indicating whether the mobiles belong to the same user.

14 Claims, 10 Drawing Sheets

(56) References Cited

U.S. PATENT DOCUMENTS

| | | | | |
|---|---|---|---|---|
| 2014/0045530 A1* | 2/2014 | Gordon | ................ | H04W 4/029 |
| | | | | 455/456.2 |
| 2016/0217195 A1* | 7/2016 | Abrahams | ............. | H04L 67/306 |
| 2016/0302030 A1* | 10/2016 | White | .................... | H04L 67/18 |
| 2019/0220583 A1* | 7/2019 | Douglas | ................ | G06F 21/316 |

OTHER PUBLICATIONS

Lynndee Marooney, "How do I Find Out If My Husband Has a Secret Cell Phone?," https://oureverydaylife.com/do-husband-secret-cell-phone-6908206.html, Jan. 10, 2019.

* cited by examiner

SYSTEM AND METHOD FOR MOBILE ALIAS IDENTIFICATION

CROSS-REFERENCE TO RELATED APPLICATIONS

This application is related to co-filed U.S. patent application Ser. No. 16/286,480, entitled "Identifying Mobile Aliases," which is incorporated by reference.

FIELD OF THE INVENTION

The invention relates generally to the field of telecommunications and more particularly to systems and methods for identifying mobile units belonging to the same user.

BACKGROUND

A salient advantage of wireless telecommunications is the wireless user may use his or her terminal anywhere. FIG. 1 shows the salient components of a wireless telecommunications system 100 in accordance with the prior art. The system 100 comprises: wireless terminal 101 and 110, cellular base stations 102-1, 102-2, and 102-3, Wi-Fi base stations 103-1 and 103-2, and wireless switching center 111, and location system 112 interconnected as shown. Wireless telecommunications system 100 provides wireless telecommunications service to all wireless terminals in its coverage areas, in well-known fashion. Location system 112 provides data indicating the geographic location of a mobile unit. Global Positioning System constellation 121 is also depicted in FIG. 1, but it is not part of wireless network 100.

There are a variety of reasons why a remote party might be interested in knowing the user's location. For example, the recipient of an E 9-1-1 emergency call from a wireless terminal might be interested in knowing the location of the wireless terminal so that emergency services vehicles can be dispatched to that location. Or, if the wireless terminal remains mobile, the emergency services may wish to track its location.

Despite the advantages of tracking and locating mobile units, there are users of wireless terminals who wish to avoid tracking. Sometimes these users wish to avoid tracking in aid of unlawful or dangerous activity. Such users may employ multiple cell phones, each having its own Subscriber Identity Module (SIM), Mobile Equipment Identifier, or International Mobile Station Equipment Identity, depending on the technology in use. Others have been known to discard and replace mobile phones on a very short-term basis. By doing so, these users in effect use multiple identifiers or aliases and may do so for nefarious reasons.

At times, an analyst may wish to understand whether mobiles are actually aliases of each other. This could arise where the mobiles are known to be active or where one mobile is a suspected replacement of another. In other cases, an analyst may wish to learn all the potential aliases of a known mobile either currently in use or discarded. Due to the nature of mobile telephone use, mobile unit identifiers can be considered user identifiers for tracking purposes. US Publication 2014/0038553, "Recognizing Unknown Actors Based on Wireless Behavior," (the '553 Application) incorporated here in full by reference, discloses a system and method for analyzing telecommunication events to infer whether a user's mobile unit behavior substantially matches the behavior of another mobile unit.

In the illustrative method of the '553 Application, a data processing system generates a pattern of behavior based on events associated with a wireless terminal. A mobile's pattern of behavior comprises mobile events and location attributes measured over some period of time. The pattern of behavior is measured against another pattern of behavior associated with a different mobile to determine how closely the patterns compare. Depending on the measured similarity, the data processing system infers whether the mobiles may belong to the same user. Examples of events include call origination, call reception, SMS origination, SMS receipt, powering on, location detection, etc., as has been previously delineated.

Despite the disclosure of the '533 Application, there remains a need to identify where a target uses two mobiles over a period of time, and where a target replaces one mobile with another. There also remains a need to identify potential mobile aliases from a group of aliases where no single mobile may be a target.

SUMMARY

Systems and methods according to the principles of the invention determine when two or more phones belong to the same person or target. In one aspect, the identifiers of actively used mobiles are known, but whether the mobiles belong to the same user is unknown. In this aspect, the system analyzes historical location data to determine whether the mobiles are located at the same place at the same time, and when at a given location one phone is turned off and the other is turned on (spatial transition). The system also analyzes historical calling patterns to determine whether the calling patterns are similar or whether one phone becomes active when the other becomes inactive (temporal transition). A mobile is considered active when the mobile has an active mobile telephone number associated with it. An active mobile may be turned on or off and still be considered active. A mobile becomes inactive when the mobile no longer has an active mobile telephone number associated with it.

The system also tracks the phones over a period of time. The tracking includes ascertaining location data and call event data. After a suitable period of tracking, the system analyzes the mobiles' location and call event data for similarities. The system also analyzes the mobiles for spatial transition. Similar calling patterns and overlapping spatial transitions suggest that or are probative of the fact that the phones belong to the same user In another aspect of the invention, the identifiers of multiple phones are known, but the owner discards mobiles and replaces them with another at times of the user's choosing. In such cases, a system and method according to the invention determines a mobility profile of the input phones. A mobility profile aggregates location data into zones and correlates a mobile unit's zones to times. In an aspect of the invention, mobility profiles are compared according to a matching profile algorithm. An exemplary matching profile algorithm determines a weighted score for the geographic and temporal overlap of phone usage on an hourly basis. If the score meets a threshold, the algorithm indicates that the phones belong to the same user.

In other cases it is desirable to determine, for a given known phone, whether the user may be using other mobiles. This differs from the preceding example in that the analyst seeks to determine whether the known phone may have presently unknown aliases. In this aspect of the invention, the user can maintain the phones belonging to the user or can discard and replace mobiles according to the user's desires. Where a user maintains and uses multiple phones, a method according to the invention identifies a subset of candidate phones. In selected areas around the known phone, phones used above an activity threshold in a given period are considered candidate phones. Processing the candidate phones with a matching profile algorithm over a selected period identifies phones likely belonging to the same user as the known phone.

DETAILED DESCRIPTION

For the purposes of this specification, the following terms and their inflected forms are defined as follows:

The term "geo-temporal data" is defined as data that comprises (i) a datum that indicates a location, and (ii) a temporal datum that is associated with the location, e.g., a point in time, a period of time, a duration, etc.

The term "location" is defined as any one of a zero-dimensional point, a one-dimensional line, a two-dimensional area, or a three-dimensional volume. Thus, a location can be described, for example, by a street address, geographic coordinates, a perimeter, a geofence, a cell ID, or an enhanced cell ID.

The term "geofence" is defined as a virtual perimeter surrounding a geographic area.

The term "location convergence" refers to two or more mobiles at the same geographic location at a point in time. The term "location divergence" refers to two or more mobiles at different geographic locations at a point in time.

The term "mobility profile" means a correlation of zones to timeslots for a mobile, where zones are an aggregation of locations.

The term "telecommunications event" is defined as any occurrence involving electronic communications over a distance between a (wired or wireless) terminal and another entity in the context of the serving network (such as a base station controller, a switching center, an antenna, another terminal, etc.)—whether the involved telecommunications are wireless or wired (including electrical, optical, wire, and/or fiber) or a combination of wireless and wired. Typically, in the present context, a telecommunications event occurs between a wireless terminal and an element of wireless network 200.

The term "spatial transition" refers to a circumstance where one mobile powers off and another mobile powers on at approximately the same location at approximately the same time. This term is used interchangeably with the term "spatial handover."

The term "temporal transition" refers to a circumstance where one mobile powers on and another mobile powers off at the same time but not necessarily at the same location. This term is used interchangeably with the term "temporal handover."

The term "wireless terminal" is defined as an apparatus that:
(i) receives signals from another apparatus without a wire, or
(ii) transmits signals to another apparatus without a wire, or
(iii) both (i) and (ii).

This terms "wireless telecommunications terminal," "user equipment," "mobile terminal," "mobile station," "mobile handset," and "mobile unit" are herein defined to be synonyms.

Figure 1:
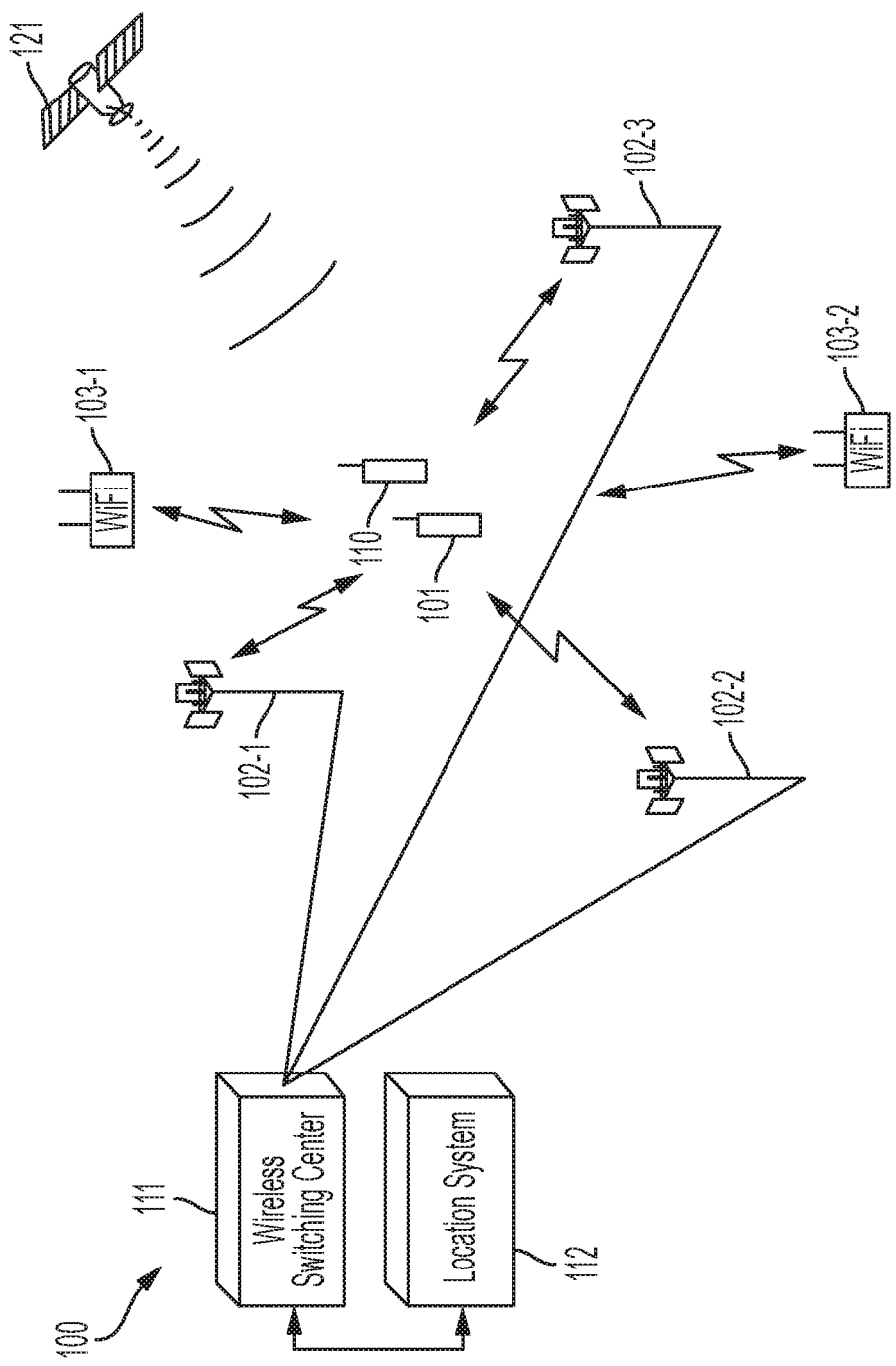
FIG. 1 depicts a diagram of the salient components wireless telecommunications system 100 in accordance with the prior art.
Figure 2:
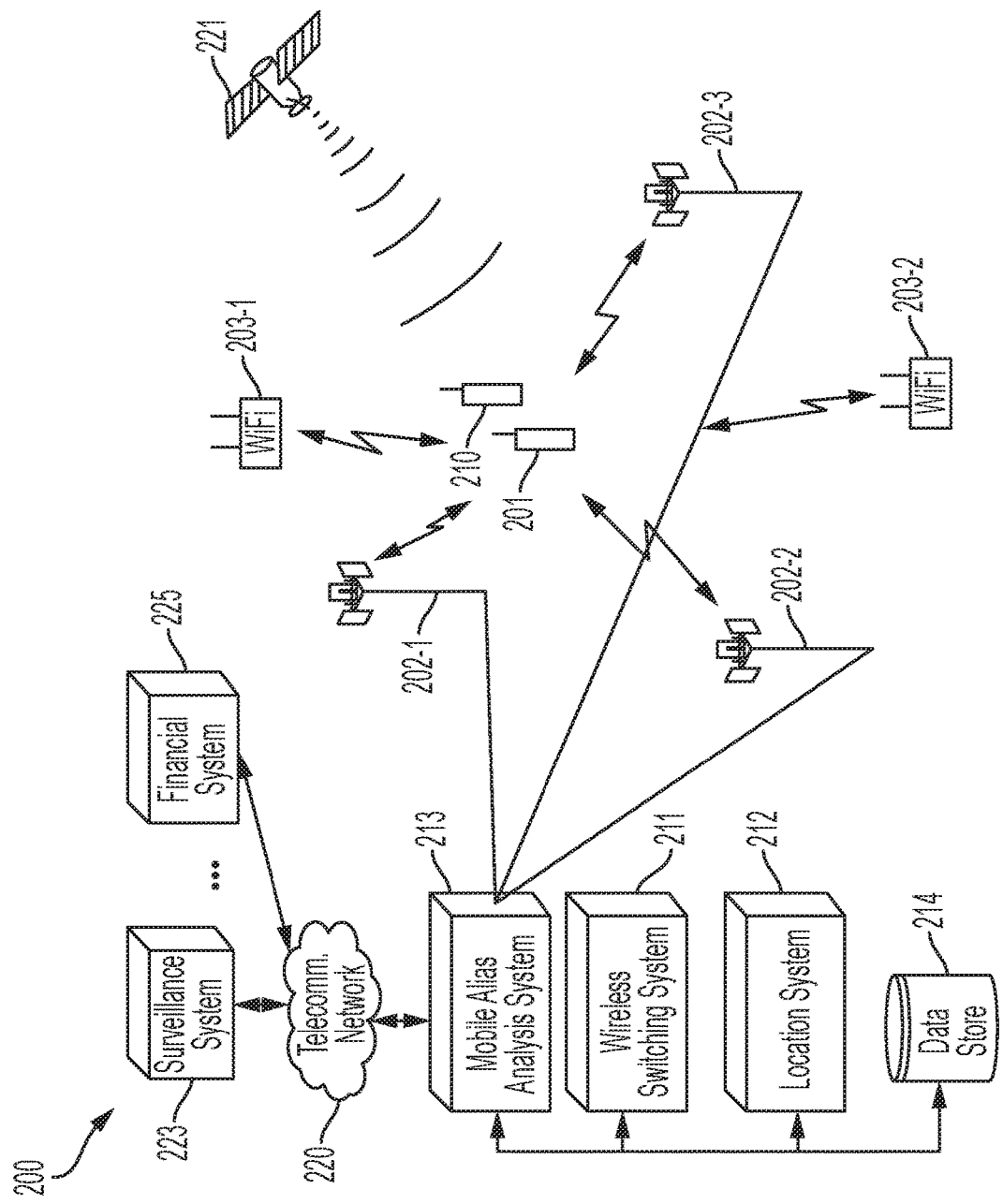
FIG. 2 depicts a diagram of the salient components of wireless telecommunications system 200 in accordance with the illustrative embodiment of the present invention.

FIG. 2 depicts a diagram of the salient components of wireless telecommunications network 200 in accordance with the illustrative embodiment of the present invention. Wireless network 200 comprises wireless terminals 201 and 210, cellular base stations 202-1, 202-2, and 202-3, Wi-Fi base stations 203-1 and 203-2, wireless switching center 211, location system 212, mobile alias analysis system 213, and data store 214, which are interrelated as shown. Wireless network 200 provides wireless telecommunications service to all wireless terminals within its coverage area in well-known fashion; in addition, mobile alias analysis system 213 performs and coordinates the operations as described in more detail below. Global Positioning System ("GPS") constellation 221 is also depicted in FIG. 2, but is not part of wireless network 200. Likewise, telecommunications network 220, surveillance system 223, and financial system 225 are also depicted in FIG. 2, but are not part of wireless network 200. Other external systems also are connected to mobile alias analysis system 213 via telecommunications network 220 but are not expressly depicted in FIG. 2, e.g., a facial recognition system, a GPS tracking system, a credit reporting system, a roadway-traffic camera system, a roadway toll-booth system, etc., without limitation.

In accordance with the illustrative embodiment, wireless telecommunications service is provided to wireless terminals 201 and 210 (whether at the same time or at different times) in accordance with the air-interface standard of the 3rd Generation Partnership Project ("3GPP"). Examples of 3GPP air-interface standards include GSM, UMTS, and LTE. After reading this disclosure, however, it will be clear to those skilled in the art how to make and use alternative embodiments of the present invention that operate in accordance with one or more air-interface standards (e.g., CDMA-2000, IS-136 TDMA, IS-95 CDMA, 3G Wideband CDMA, IEEE 802.11 Wi-Fi, 802.16 WiMax, Bluetooth, etc.) in one or more frequency bands.

Wireless terminals 201 and 210 each comprises the hardware and software necessary to be 3GPP-compliant and to perform the processes described below and in the accompanying figures. Wireless terminals 201 and 210 are mobile. For example and without limitation, wireless terminals 201 and 210 each is capable of: measuring one or more traits of each of one of more electromagnetic signals (received from cellular base stations 202-1, 202-2, and 202-3 and Wi-Fi base stations 203-1 and 203-2) and of reporting the measurements to location system 214, and transmitting one or more signals to cellular base stations 202-1, 202-2, and 202-3 and Wi-Fi base stations 203-1 and 203-2, including reports of telecommunications events experienced by the respective wireless terminal; and receiving service from one or more of cellular base stations 202-1, 202-2, and 202-3 and Wi-Fi base stations 203-1 and 203-2.

Illustrative examples of telecommunications events that are experienced and reported by wireless terminals 201 and/or 210 include without limitation:
  a. an origination of a voice call by the wireless terminal,
  b. a receiving of a voice call by the wireless terminal,
  c. an establishment of a voice call between the wireless terminal in the wireless network and another telecommunications terminal, whether in the network or elsewhere, i.e., establishing a call connection,
  d. an origination of a Short Message Service ("SMS") message by the wireless terminal,
  e. a receiving of an SMS message by the wireless terminal,
  f. an origination of a text message by the wireless terminal,
  g. a receiving of a text message by the wireless terminal,
  h. a location update request that is transmitted by the wireless terminal to an element of the network infrastructure,
wherein the location update request is caused by at least one of the following occurrences:
    i. powering on the wireless terminal,
    ii. detecting by the wireless terminal that it is in a new location area,
    iii. originating a data session by the wireless terminal,
    iv. a handover of the wireless terminal from one serving cell to another cell,
    v. an International Mobile Subscriber Identity ("IMSI") detach message that is transmitted by the wireless terminal,
    vi. a powering off by the wireless terminal,
    vii. an International Mobile Subscriber Identity ("IMSI") attach message that is transmitted by the wireless terminal when it powers on, and
    viii. a powering on by the wireless telecommunications terminal,
  ix. an origination by the wireless terminal of an Unstructured Supplementary Service Data ("USSD") session,
  x. an origination of a data session by the wireless terminal,
  xi. an ending of a data session by the wireless terminal,
  xii. an activation, for the wireless terminal, of a packet data protocol ("PDP") context by a GPRS Support Node in the wireless network,
  xiii. a deactivation, for the wireless terminal, of a packet data protocol ("PDP") context by a GPRS Support Node in the wireless network,
  xiv. the wireless terminal attaching to a packet radio data network in the wireless network, and
  xv. the wireless terminal detaching from the packet radio data network in the wireless network.

Records are generated that report on the telecommunications events listed above, wherein each record also comprises geo-temporal data associated with the telecommunications event. It will be clear to those having ordinary skill in the art how to recognize and implement the corresponding terms, if any, for non-3GPP types of wireless networks.

Wireless terminals 201 and 210 each is illustratively a smartphone with both voice and data service provided and supported by wireless network 200 (whether both terminals are active at the same time or at different times). It will be clear to those having ordinary skill in the art, after reading the present disclosure, how to make and use wireless network 200 with wireless terminal 201 that is a cell phone, a data tablet, or a combination thereof. It will be clear to those having ordinary skill in the art, after reading the present disclosure, how to make and use wireless network 200 with wireless terminal 210 that is a cell phone, a data tablet, or a combination thereof. Wireless terminals 201 and 210 are illustratively in service at the same time, but need not be. It will be clear to those skilled in the art, after reading this disclosure, how to make and use alternative embodiments of the present invention that comprise any number of wireless terminals supported by wireless network 200.

Cellular base stations 202-1, 202-2, and 202-3 communicate with wireless switching center 211 by wire, and with wireless terminals 201 and 210 via radio frequencies ("RF") in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading the present disclosure, how to make and use alternative embodiments that comprise any number of base stations.

Cellular base stations 202-1, 202-2, and 202-3 comprise the hardware and software necessary to be 3GPP-compliant. For example and without limitation, cellular base stations 202-1, 202-2, and 202-3 are each capable of: measuring one or more traits of each of one or more electromagnetic signals (transmitted by wireless terminal 201 and wireless terminal 210), and reporting the measurements to location system 212; detecting one or more of the telecommunications events occurring at wireless terminal 201 and wireless terminal 210; transmitting one or more signals, and reporting the transmission parameters of those signals, and reporting telecommunications events to location system 212; and reporting on the above-enumerated telecommunications events associated with a wireless terminal.

Wi-Fi base stations 203-1 and 203-2 communicate with wireless terminals 201 and 210 via radio frequencies ("RF") in well-known fashion (whether at the same time or at different times). Wi-Fi base stations 203-1 and 203-2 have a shorter range than cellular base stations 202-1, 202-2, and 202-3, but sometimes have a higher bandwidth. Wi-Fi base stations 203-1 and 203-2 are each capable of, without limitation, measuring one or more traits of each of one of more electromagnetic signals (transmitted by wireless terminal 201 and wireless terminal 210), reporting the measurements to location system 212, detecting one or more of the telecommunications events occurring at wireless terminal 201 and wireless terminal 210, transmitting one or more signals and reporting the transmission parameters of those signals, reporting telecommunications events to location system 212, and reporting on the above-enumerated telecommunications events associated with a wireless terminal.

It will be clear to those having ordinary skill in the art how to make and use alternative embodiments comprising base stations (cellular, WiFi, etc.) and/or access points that are not capable of reporting transmission parameters and/or measurements to location system 212; in such configurations, it will be clear to those having ordinary skill in the art how to use probes to monitor the respective interface between the base station and/or access point and other network entities to gather measurement and event information from/about the wireless terminals and transmit the gathered information to a location system such as illustrative location system 212.

Wireless switching center 211 comprises a switch that orchestrates the provisioning of telecommunications service to wireless terminals 201 and 210 and the flow of information to and from location system 212, and mobile alias analysis system 213, and data store 214, as described below and in the accompanying figures. Wireless switching center 211 collects data from throughout wireless network 200, including telecommunications events reports that are reported by wireless terminals and/or by base stations, and generates telecommunications-event records according to the telecommunications events that are listed above, without limitation. Illustratively, wireless switching center 211 collects location data from location system 212, from the base stations, and from wireless terminals 201 and 210. Each telecommunications-event record generated by wireless switching center 211 associates the reported-on telecommunications event with a geo-temporal datum that indicates a location and time at which the reported-on telecommunications event is estimated to have occurred. Wireless switching center 211 provides the telecommunications-event records to a mobile alias analysis system 213 and to data store 214.

As is well known to those skilled in the art, wireless switching centers are also commonly referred to by other names such as mobile switching centers, mobile telephone switching offices, routers, packet data service nodes, GPRS support nodes, or a combination thereof, etc. Although the illustrative embodiment comprises one wireless switching center, it will be clear to those skilled in the art, after reading this disclosure, how to make and use alternative embodiments of the present invention that comprise any number of wireless switching centers. In accordance with the illustrative embodiment, all of the base stations servicing wireless terminals 201 and 210 are associated with wireless switching center 211. It will be clear to those skilled in the art, after reading this disclosure, how to make and use alternative embodiments of the present invention in which any number of base stations are associated with any number of wireless switching centers. It will be further clear to those having ordinary skill in the art, after reading this disclosure, how to make alternative embodiments wherein wireless switching center 211 is not the entity that generates the telecommunications-event records, and instead location system 212 generates these records; or location system 212 generates these records based at least in part on data gathered from probes; or a combination of center 211-generated and system 212-generated records; or the telecommunications-event records are generated by another system whether part of wireless network 200 or outside wireless network 200 and are made available to mobile alias analysis system 213 for processing and analysis as described in further detail below.

Location system 212 comprises hardware and software that estimates one or more locations for wireless terminals 201 and 210. Preferably, location system 212 is a mass location system that provides geo-temporal data that is to be incorporated into telecommunications-event records, and further provides real-time geo-temporal data on demand. According to the illustrative embodiment, location system 212 is the OmniLocate wireless location platform product from Polaris Wireless, Inc. OmniLocate is a mass location system that estimates a location that is associated with telecommunications events, including events other than call origination and call termination-events such as location area updates, powering on, powering off, etc. OmniLocate provides location capabilities across 2G (GSM/CDMA), 3G (UMTS/WCDMA), and 4G (LTE) air interfaces, as well as indoor technologies such as Wi-Fi, DAS, and Femtocells. OmniLocate incorporates Polaris Wireless Location Signatures (Polaris WLS™) technology, which determines a terminal's location by comparing radio measurements reported by the wireless device (or by a base station) against those in a comprehensive radio environment database. OmniLocate enables the ability to simultaneously locate all subscribers in a wireless network in real-time and on a historical basis.

Examples of telecommunications events that preferably elicit a location estimate from location system 212 are given above in reference to wireless terminals 201 and 210. Thus, the OmniLocate platform enables wireless switching center 211 to generate and provide more granular telecommunications-event records than standard call-detail records in the prior art, because OmniLocate estimates and transmits more precise location data, e.g., a 10-meter by 10-meter area, which is of a finer resolution than a cell ID or enhanced cell ID. Also, the granularity of available data is further improved by the fact that more telecommunications events are captured and reported in these telecommunications-event records than in the prior art call-detail records.

In the illustrative embodiment, location system 212 includes a data processing system that comprises hardware and software, and that is configured to perform geo-temporal analysis. An exemplary geo-temporal analysis system is described in US Publication US20140045530, which is incorporated herein by reference. It will be clear to those having ordinary skill in the art, after reading the present disclosure, how to make and use alternative embodiments of the present invention wherein the records generated by location system 212 (preferably OmniLocate with Polaris WLS™) incorporate geo-temporal data into telecommunications-event records at wireless switching center 211 and are transmitted to a geo-temporal analysis system that does not form part of location system 212.

Also in the illustrative embodiment, the location system 212 includes a data-processing system that performs behavior analysis that analyzes telecommunications-event records and other relevant records to infer whether a user's wireless behavior over the course of time is substantially similar to or even identical to the wireless behavior of a known actor. Such a behavior analysis system is described in "Recognizing Unkown Actors Based on Wireless Behavior," U.S. Publication No. 2014/0038553, which is incorporated herein by reference. It will be clear to those having ordinary skill in the art, after having read the present disclosure, how to make and use a behavior analysis system in connection with the illustrative embodiment of the invention. It also will be clear to those having ordinary skill in the art, after having read the present disclosure, how to make and use a behavior analysis system that forms a part of the telecommunications network and that transmits and receives data from the network elements, including the data store 214, without forming a part of location system 212.

Mobile alias analysis system 213 is a data-processing system that comprises hardware and software, and that is configured to perform the mobile alias analysis according to the illustrative embodiment of the invention. It 213 executes and coordinates the operations described herein in reference to the processes 400, 500 and 600 according to the invention. The mobile alias analysis system 213 according to the invention communicates with the location system 212 and the other elements of the wireless network. It will be clear to those having ordinary skill in the art, after having read the present disclosure, how to make and use alternative embodiments wherein mobile alias analysis system 213 communicates with elements of wireless network 200, but is not an element thereof.

Data store 214 is a digital data storage system that is responsible for receiving data, storing data, archiving data, and retrieving data in a fashion that is well-known in the art. Illustratively, data store 214 is implemented as a hard disk drive that is part of wireless network 200. Illustratively, data store 214 receives the results of the analysis performed by mobile alias analysis system 213 and/or the location system 212 and archives these results along with the various records and data received by mobile alias analysis system 213. It will be clear to those having ordinary skill in the art, after reading the present disclosure, how to make and use alternative embodiments wherein data store 214 communicates with elements of wireless network 200, but is not an element thereof.

Telecommunications network 220 provides connectivity and telecommunications (voice and/or data) among the systems that connect to it, including mobile alias analysis system 213, surveillance system 223, financial system 225, and other systems that are external to wireless network 200 but are not shown in FIG. 2, e.g., a facial recognition system, a GPS tracking system, a credit reporting system, a roadway-traffic camera system, a roadway toll-booth system, etc., without limitation.

Global Positioning System ("GPS") constellation 221 is well known in the art and provides precise location data to GPS-enabled wireless terminals and to any GPS-enabled system on Earth, including for example to a GPS tracking system (not shown) that telecommunicates with mobile alias analysis system 213 or location system 212.

Surveillance system 223 is well known in the art and telecommunicates with mobile alias analysis system 213 (illustratively via telecommunications network 220) to transmit surveillance records to mobile alias analysis system 213. For example, surveillance system 223 provides records indicating that wireless terminal 201 is at a location that is under surveillance by surveillance system 223.

It will be clear to those having ordinary skill in the art, after reading the present disclosure, how to make and use alternative embodiments wherein the mobile alias analysis system 213 is incorporated into one of the other illustrated systems, e.g., location system 212, or wireless switching center 211, or surveillance system 223. It will be further clear to those having ordinary skill in the art, after reading the present disclosure, how to make and use alternative embodiments wherein the mobile alias analysis system 213 further comprises one or more of the other illustrated systems, e.g., location system 212 and/or wireless switching center 211 and/or data store 214. It will be further clear to those having ordinary skill in the art, after reading the present disclosure, how to make and use alternative embodiments wherein mobile alias analysis system 213 telecommunicates directly with one or more external systems without the intervening services of telecommunications network 220.

Figure 3:
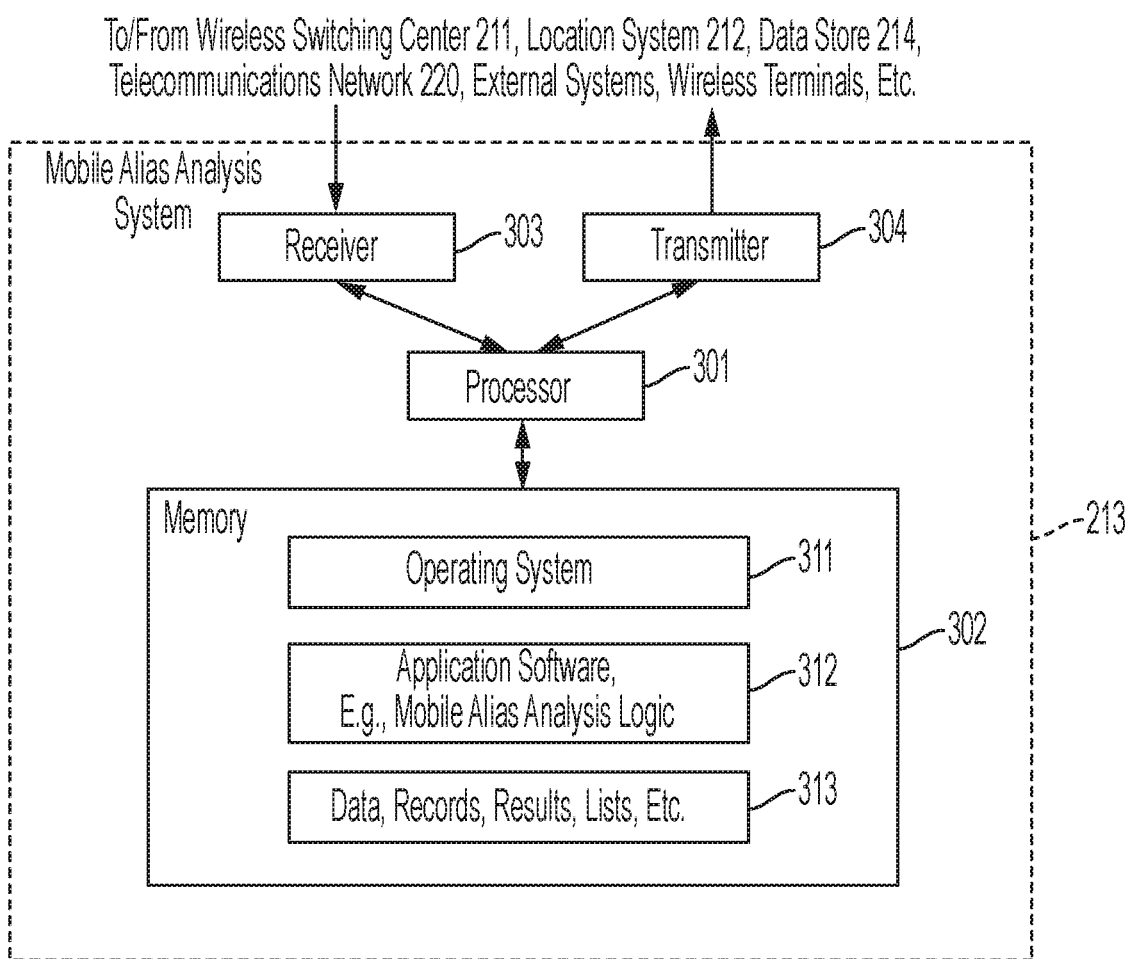
FIG. 3 depicts a block diagram of the salient components of mobile alias analysis system 213 in accordance with the illustrative embodiment of the present invention.
Figure 4A:
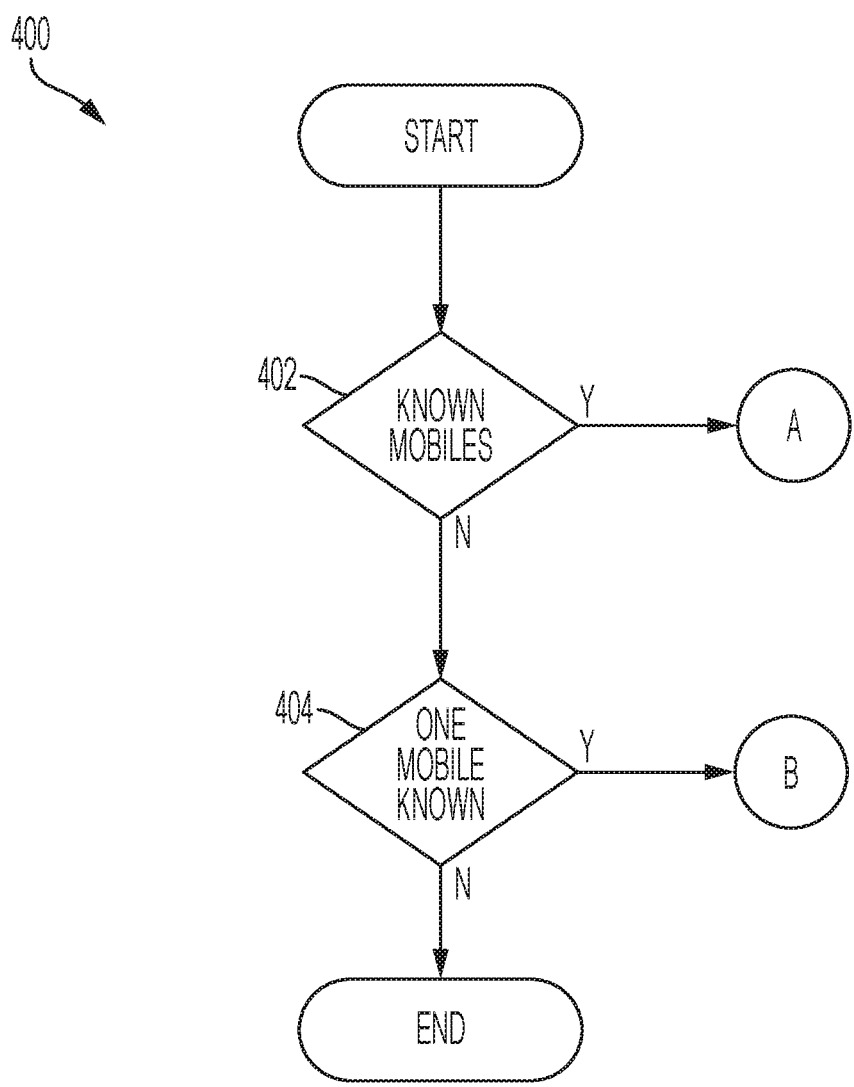
FIGS. 4A through 4E together depict a flowchart of the salient tasks performed by the mobile alias analysis system 213, as shown in FIG. 2, in accordance with the illustrative embodiment of the present invention.
Figure 4B:
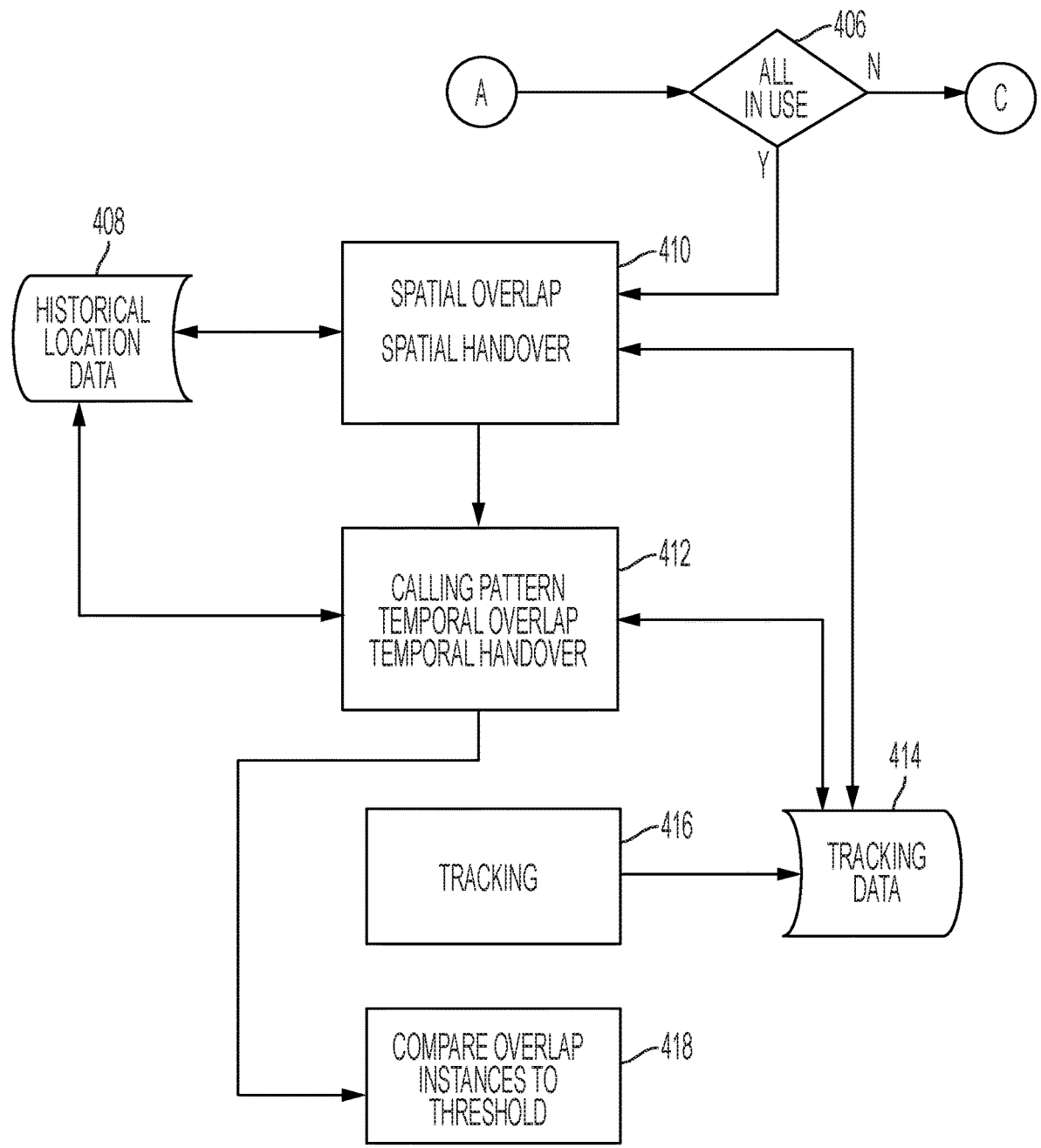
Figure 4C:
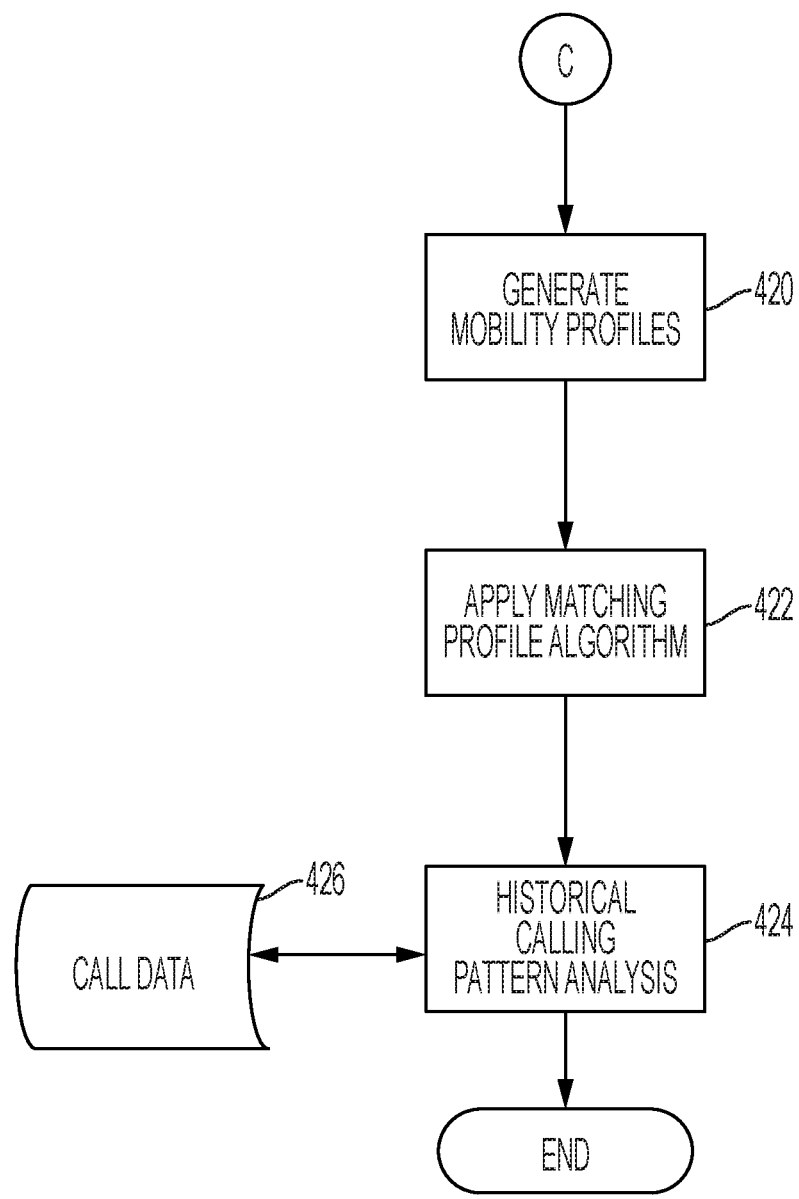
Figure 4D:
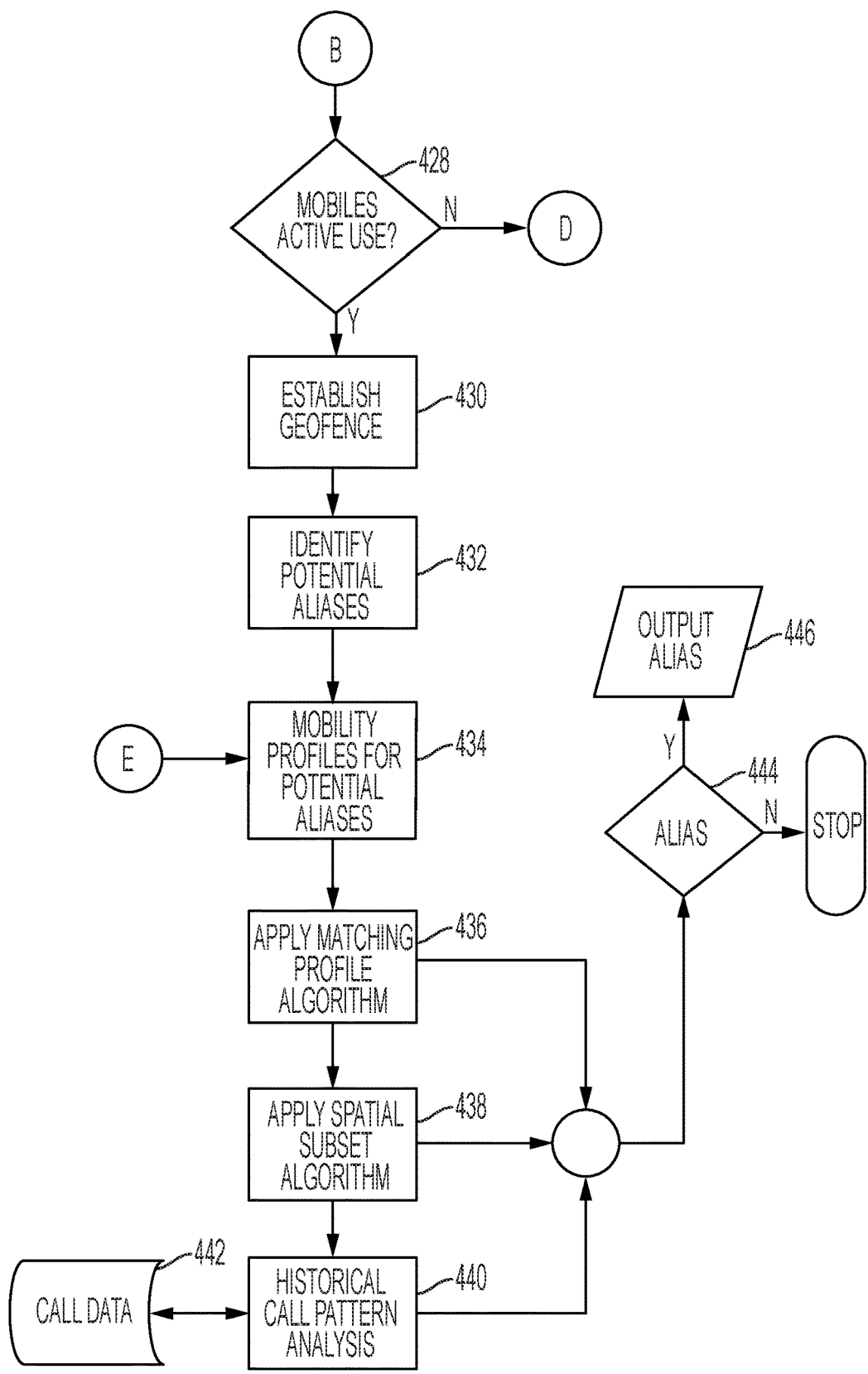
Figure 4E:
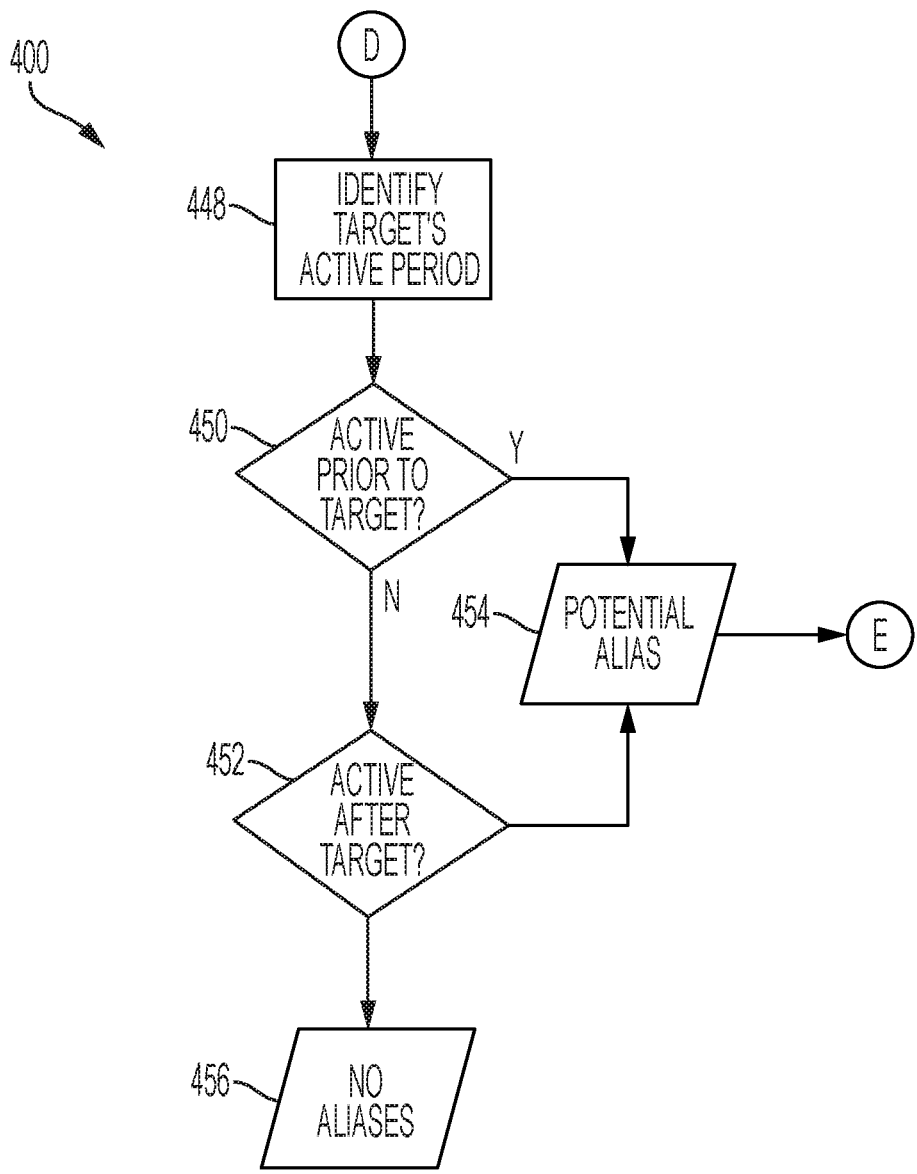

FIG. 3 depicts a block diagram of the salient components of mobile alias analysis system 213 in accordance with the illustrative embodiment. Illustrative embodiment 213 is a data-processing system that comprises as part of its hardware platform: processor 301, memory 302, transmitter 303 and receiver 304. Processor 301 is a programmable processing device such as a microprocessor that is well known in the art. When operating in conjunction with the other components of illustrative embodiment 213, processor 301 executes the software, processes data, and telecommunicates according to the operations described herein.

Memory 302 is non-transitory and non-volatile computer memory technology that is well known in the art. Memory 302 stores operating system 311, application software 312, and element 313 (which comprises data, records, results, lists, etc.) It will be clear to those having ordinary skill in the art how to make and use alternative embodiments that comprise more than one memory 302; or subdivided segments of memory 302; or a plurality of memory technologies that collectively store operating system 311, application software 312, and element 313. The specialized application software 312 that is executed by processor 301 is illustratively denominated the "mobile alias analysis logic" that enables mobile alias analysis system 213 to perform the operations of methods according to the invention.

Transmitter 303 is a component that enables illustrative embodiment 213 to telecommunicate with other components internal and external to wireless network 200 by transmitting signals thereto. For example, transmitter 303 enables telecommunication pathways to wireless switching center 211, location system 212, data store 214, etc. within wireless network 200, as well as to other systems that are external to wireless network 200, such as telecommunications network 220, a surveillance system, a tracking system, a financial system, another wireless network, etc., without limitation. Transmitter 303 is well known in the art. It will be clear to those having ordinary skill in the art how to make and use alternative embodiments that comprise more than one transmitter 303.

Receiver 304 is a component that enables illustrative embodiment 213 to telecommunicate with other components internal and external to wireless network 200 by receiving signals therefrom. For example, receiver 304 enables telecommunication pathways from wireless switching center 211, location system 212, data store 214, etc. within wireless network 200, as well as from other systems that are external to wireless network 200, such as telecommunications network 220, a surveillance system, a financial system, a tracking system, another wireless network, etc., without limitation. Receiver 304 is well known in the art. It will be clear to those having ordinary skill in the art how to make and use alternative embodiments that comprise more than one receiver 304.

It will be clear to those skilled in the art, after reading the present disclosure, that in alternative embodiments the data-processing hardware platform of mobile alias analysis system 213 can be embodied as a multi-processor platform, as a server, as a sub-component of a larger computing platform, or in some other computing environment—all within the scope of the present invention. It will be clear to those skilled in the art, after reading the present disclosure, how to make and use the data-processing hardware platform for mobile analysis system 213.

In the method according to the principles of the invention, the data processing system 213 develops subscriber mobility profiles, which comprise a reduced set of data points sufficient to profile aspects of the mobile's behavior. In one aspect of the invention, mobile locations collected over a period are aggregated into geographic zones. Consider the following example: a subscriber lives in an apartment complex and works in a nearby office complex. The behavior pattern for the subscriber indicates multiple call originations and SMS activity from within the apartment, further activity in the apartment complex common areas, and activity from a car nearby the apartment complex. The mobile exhibits still further activity on the subscriber's work commute and then activity from different locations within the office complex.

According to the principles of the invention, this location data may be aggregated into a mobility profile where there are only two zones: the apartment complex and the office campus. The geographic reach of a zone is not limited to a location, nor must each zone cover equal area. According to the present invention, subscriber mobility profile zones can be aggregated and stored in memory accessible to the mobile alias analysis system 213.

FIGS. 4A through 4E together illustrate exemplary processing carried out in mobile alias analysis system 213 according to the principles of the invention. In steps 402 and 404, the system 213 determines whether the analyst seeks to determine whether mobiles with known identifiers are aliases, or whether the analyst seeks to identify whether unknown mobiles may be aliases of a known mobile. If the mobiles are known, then in step 406 the processing determines whether the mobiles are in active use or whether one or more mobiles are no longer active, such as may be the case in a use and throw scenario as previously described. The mobile's activity status may be provided by the wireless switching system 211 or the data store 214 in the illustrated embodiment.

In the case where all the mobiles of interest are active, the processing analyzes location data 408 to determine whether there are frequent incidences of spatial overlap or of spatial handover, as at step 410. Spatial overlap indicates where both phones are at the same place at the same time, but does not consider the on-off behavior. Spatial handover occurs where one phone is turned on and another is turned off at a particular location. Tracking the mobiles, as at 416, at high frequency (determining the mobile's location in short time intervals) and with high location resolution (such as a 10 meter by 10 meter square) for spatial and handover overlap provides data 414 for similarity analysis. This data 414 can be used with historical data 408 for calling pattern analysis, temporal overlap (mobiles are on or off at the same time), and temporal handover (one mobile turns off and the other turns on, but not necessarily at the same location), as at step 412. The data processing system 213 can be used to predict future overlapping events (not shown). If the predictions are correct, then the data processing system infers the mobiles belong to the same user. In a comparison process 418, the system weights the instances of similarity and compares the weight to a threshold to infer whether the mobiles may be aliases of each other.

In another aspect of the invention, the mobiles are used in a use and throw scheme; therefore, step 406 determines that at least one of the known mobiles is no longer active. Data indicating spatial handovers will not be present because the user discards one phone after a period of use and then uses another phone. In the use and throw scenario, the data processing system 213 generates mobility profiles for the candidate phones, as at step 420. The process applies a matching profile algorithm at step 422 to determine or infer whether the candidate mobiles belong to the same user, as will be explained hereafter in connection with FIG. 5. The historical call data and SMS pattern data 426 of the candidate mobiles can also be compared, as at step 424. Based upon predetermined thresholds of similarity, the process 400 infers that the candidate phones may be aliases.

Returning to steps 402 and 404, another use case involves determining whether unknown phones may be an alias of a known phone. The analyst provides the data processing system a target mobile identifier and the data processing system returns identifiers for mobiles that are potential aliases of the input mobile. Where the mobiles are active, as determined at step 428, the exemplary process establishes a geo-fence (a geographic perimeter) of configurable area, as at step 430. Using location systems such as 212, the process 432 determines other mobiles frequently occurring within the geo-fence. These mobiles are considered potential aliases. Further, the data processing system optionally determines whether any mobiles within the geo-fence have exhibited abnormal behavior, such as use of text message only or a mobile that has been used in an abnormally low amount of calls, and may infer theses mobiles are potential aliases.

The process compares the target mobile's and potential alias mobiles' mobility profiles by applying a matching profile algorithm, as at 434 and 436. The algorithm identifies phones that exhibit overlapping profiles thereby indicating a higher likelihood that the phones belong to the same person. The process for this use case may also determine whether one mobile's zones of use are a subset of another's by applying a spatial subset algorithm, as at step 438. The process further infers that phones exhibiting overlapping spatial subsets belong to the same user. Optionally, the process 400 analyzes historical call data 442, as at step 440, for additional data points from which the system may conclude mobiles belong to the same user, as at steps 444 and 446.

In the use and throw scenario, determined at step 428, the process at step 448 determines the active period for the target mobile. Next, in decision steps 450 and 452, the process determines a subset of phones in use either before the target mobile's first use or after the target mobile's last use. A slight overlap in use may be permitted, but in any case the steps 448, 450 and 452 provide a list of mobiles that may have been part of a use and throw scenario.

These steps may nevertheless yield an undesirably large list of potential aliases to test using behavioral pattern analysis or other mobile alias analysis logic. In one aspect of the invention, the list may be reduced with a filter. For example, the list can be generated from mobiles in use during a 6-month window (or some other period). The process outputs either a list of potential aliases 454 for further processing or concludes there are no potential aliases in the candidate group analyzed, as at 456. In the event the process provides a list of candidate mobiles, the processing return to step 434 to analyze the candidates. The data processing system 213 generates a subscriber mobility profile for each candidate mobile according to the principles of the invention. The candidate profiles are compared using a matching profile algorithm. Where the algorithm indicates possible mobile aliases, the data processing system can further compare the mobile's behavior using historical call and SMS behavior.

Figure 5:
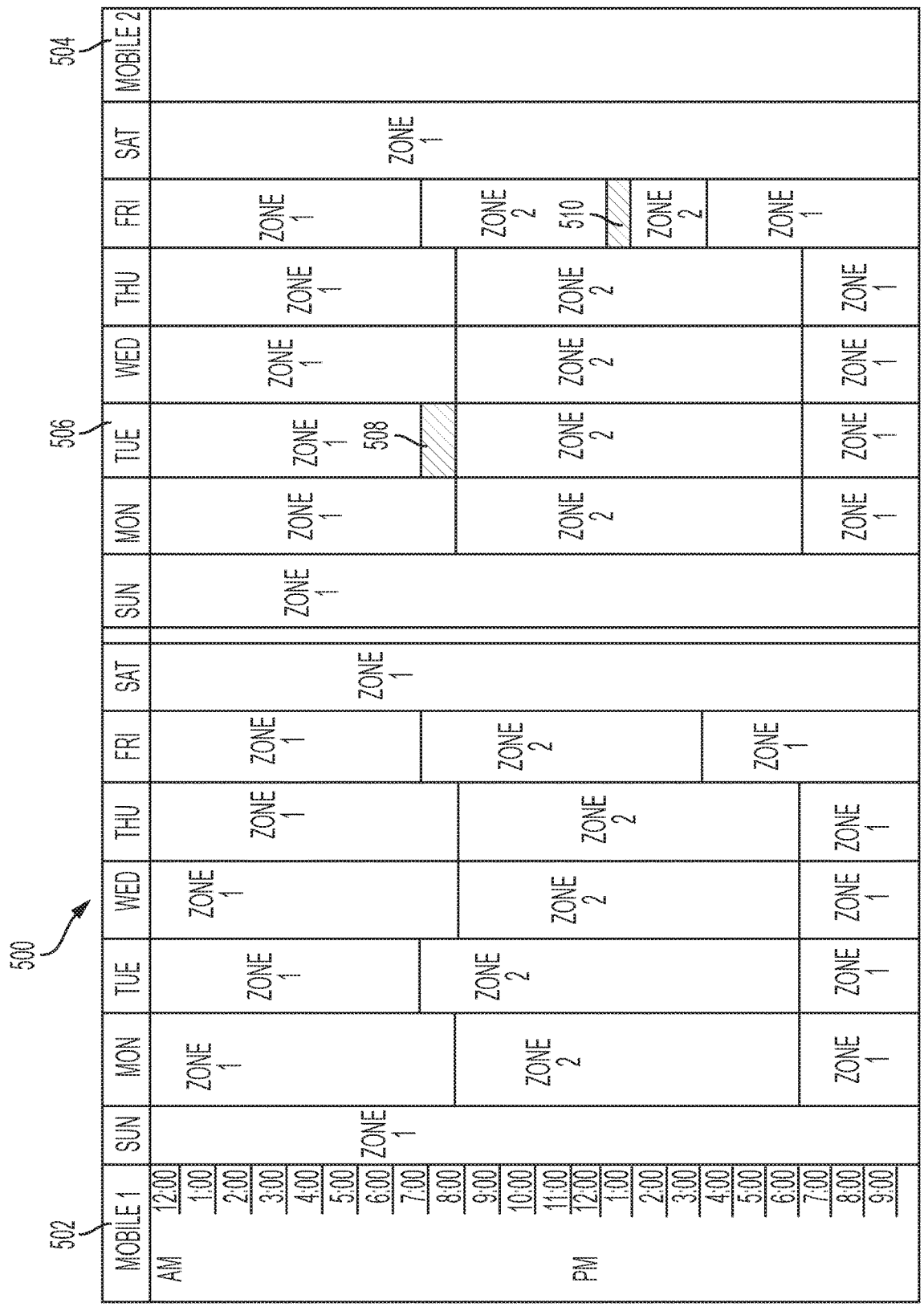
FIG. 5 depicts a mobility profile in accordance with the illustrative embodiment of the present invention.

FIG. 5 illustrates exemplary mobility profiles 500 for two subscribers 502 and 504. The exemplary mobility profiles span one calendar week, although the weeks need not be the same calendar week. For example, the analyst may wish to learn whether a user has substituted one mobile for another by comparing mobility profiles of consecutive or even non-consecutive calendar weeks. Further, the period covered in a mobility profile is configurable. Mobility profiles may cover hours, days, weeks or months, depending on the needs of the analyst.

The exemplary mobility profile periods further divide into days and hours, and consequently provide the subscribers' zone locations in 1-hour increments over the course of one week. Zones in this aspect of the invention are an aggregation of higher resolution locations that a location system 212 may provide. The total number of locations considered in a zone aggregation is configurable. The person of ordinary skill in the art after reading this disclosure will know how many locations to consider in a zone aggregation. In this example, more than 500 location attributes have been considered for each mobile 502 and 504.

Still referring to FIG. 5, for any 1 hour, the mobility profile 500 provides the zone location for the particular mobile, if that data is available. In other words, it is possible that the mobile was not locatable at a certain time, in which case no zone data would be available. Or it may be that the mobile was locatable, but that the system had not aggregated a zone for the more specific location. In any case, FIG. 5 illustrates a lack of zone data with a blank for the hour, such as at 508 and 510.

Consider, for example, the TUE column 506. It shows mobile 2 located in Zone 1 from 12:00 AM until 7:00 AM. Between 7:00 AM and 8:00 AM, there is no zone data available. Between 8:00 AM and 6:00 PM, the mobility profile 500 indicates the presence of mobile 2 in Zone 2, after which it shows mobile 2 located in Zone 1 again. A person of ordinary skill in the art after reading this disclosure will understand how to implement mobility profiles 500 as part of the mobile alias analysis system 213. In the illustrative embodiment, the mobile alias analysis system 213 builds subscriber mobility profiles and uses the profiles in the mobile alias analysis methods 400 according to the principles of the invention, as previously discussed.

Mobility profiles can be stored in advance or can be built in response to commands. The aggregation of location data is configurable, meaning that the geographic scope of a zone can vary depending on the available location data. In one illustrative method, high-resolution location data is plotted on a map over a period of time and the plots are analyzed for clusters over a predetermined area. A cluster of locations aggregates to a zone. The zones may be standardized to shape and geographic area. Based on this disclosure, it will be apparent to the person of ordinary skill in the art how to aggregate locations into zones and how to make and use the mobility profiles in a data processing network, such as mobile alias analysis system 213. It will also be apparent to a person of ordinary skill in the art, after having read this disclosure, that various data structures can be used to store a mobility profile, or that the information underlying geo-temporal data can be stored in databases that can be queried to construct mobility profiles.

FIG. 5 also illustrates mobility profile matching according to the principles of the invention. As per the mobility profile 502, on Sunday the mobile remained in the same zone for the day. The mobile moved to Zone 2 at about 8:30 on Monday morning and remained there until about 6:30 in the evening, when the mobile moved to Zone 1. On Tuesday, the mobile moved to Zone 2 at 7:30 AM and then back to Zone 1 at 6:30 PM. On Wednesday and Thursday, the mobile repeated the same movements as Monday, while on Friday the mobile moved from Zone 1 to Zone 2 at about 7:30 AM and from Zone 2 to Zone 1 at 3:30 PM. On Saturday, the mobile remained at Zone 1 for the day. This mobility profile is consistent with a person moving between home and work during the week and keeping the mobile at home on weekends. Mobile 2's mobility profile 504 depicts the mobile's zone locations over the same time window. Mobile 2 also remained in Zone 1 for Saturday and Sunday and moved between Zones 1 and 2 during the week.

In a profile-matching algorithm according to the principles of the invention, the data processing system 213 totals points based on the number of matching and differing zones between the mobiles' respective mobility profiles. In this exemplary case, the profile for mobile 2 matches the profile for mobile 1 in each hourly segment, except for approximately 1 hour on Tuesday and 1 hour on Friday.

The exemplary profile matching algorithm works like this: For each hour when mobile 1 and mobile 2 were located in the same zone, the algorithm increments a point total. For each hour when the mobiles were in different zones, the algorithm decrements a point total. For each hour neither profile indicates zone data, the algorithm increments the point total. For each hour one mobile indicates zone data but the other mobile does not, the algorithm decrements the point total. If for the profiles of interest the total points exceed a threshold, the data processing system considers the profiles matching. The threshold, increments and decrements are configurable.

Here is an exemplary point scoring algorithm that can be used in connection with the exemplary mobility profiles:
1. for each hour of the week
2. if there is a zone in both profiles then:
2(a). add 1 for overlapping zones, and
2(b). subtract 0.25 for non-matching zones;
3. if both profiles shows no zone, then add 0.25;
4. if one profile shows a zone and the other shows no zone, then subtract 0.25;
5. total the points
6. calculate 100*(points/168)=percent match;
7. if percent match is greater than threshold, output MATCH.

The above algorithm can be useful where a single subscriber carries out a use and throw strategy. In the use and throw scenario, the mobility profiles do not involve the same calendar week. (By definition, the phones are not active at the same time). In this way, the mobility profiles and the matching algorithm can detect potential aliases where a spatial or handover overlap analysis cannot.

The ordinarily skilled artisan will appreciate that the profile-matching algorithm can be configured with a different point totaling system and that the threshold can be selected to suit the particular purpose of the implementation. Likewise, the mobility profile matching algorithm can be applied to longer or shorter time windows and can determining matching zones in increments longer or shorter than 1 hour.

Figure 6:
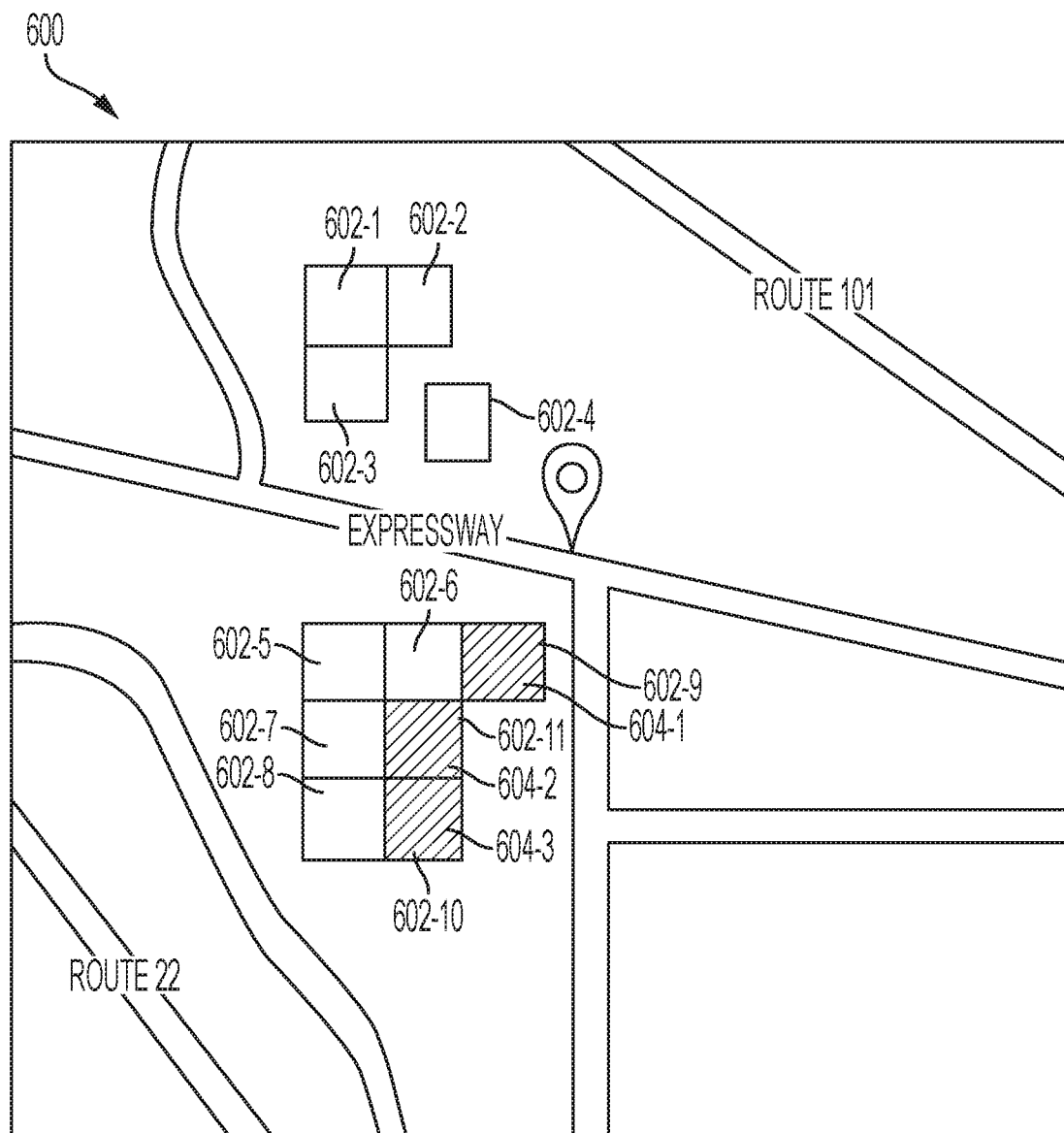
FIG. 6 depicts an exemplary spatial subset in accordance with the illustrative embodiment of the present invention.

In addition to the mobility profile-matching algorithm, aspects of the invention apply a spatial subset overlap algorithm to provide data indicative of a mobile alias. FIG. 6 illustrates spatial overlap according to the principles of the invention. In the illustration 600, zones 602 and 604 represent zones for different mobiles overlayed on a sample street map. Each zone includes tiles 602-1 to 602-11 and 604-1 to 604-3. The tiles are subregions of zones and are generated by the data processing system 213 or are called from data store 214. As previously stated, zones are aggregations of mobile locations but are not mobile locations themselves.

Tiles comprise a spatially smaller aggregation of locations within a zone. In the illustrated example, certain tiles for mobile 2 are a subset of certain tiles for mobile 1. Illustration 600 indicates the subset with cross-hatching on tiles 604-1 to 604-3 and 602-9 to 602-11. These cross-hatched tiles belong both to mobile 1 and mobile 2, meaning that location data indicates both mobile 1 and mobile 2 appeared in this subset of tiles. The remaining 9 tiles belong to either mobile 1 or mobile 2, but not both.

The following exemplary algorithm according to the principles of the invention calculates a spatial subset profile match that can be applied to spatial subset overlap as illustrated in FIG. 6:
1. For mobile 1 and mobile 2,
2. define zones for each mobile
3. define tiles for each zone
4. max=maximum number of tiles in zone
5. define threshold for match 6. if there are no matching zones, then
7. if there are matching tiles
7(a). let T=total points
7(b). for each matching tile, T=T+1
7(c). for each non-matching tile, T=T−0.25
8. % Match=100*(T/max)
9. if % Match is greater than threshold, output MATCH.

According to the above algorithm, the mobile alias analysis system 213 determines when the spatial subset profiles of certain mobiles can be considered a match, thereby tending to indicate the mobiles belong to the same user even when there are no matching zones.

A person of ordinary skill in the art reading this disclosure will know how to determine spatial subset overlap and implement the algorithm in a data processing system such as mobile alias analysis system 213. The person of ordinary skill in the art having read this disclosure will understand that the above algorithm can be configured to provide different weights to overlapping tiles and non-overlapping tiles. The geographic area tiles and zones cover and the values for max and threshold are configurable depending on the specific implementation.

In another aspect of the invention, the mobile alias analysis system 213 applies an algorithm to filter mobiles depicting similar location behaviors for reasons other than the mobiles are potential aliases. For example, consider two users residing in the same neighborhood and working at the same location. The mobiles the two users carry may exhibit very similar location patterns because each of them live and work in similar geographic areas. The location data from these mobiles represent noise to the mobile alias process of the illustrative embodiment.

The exemplary algorithm damps out the weight given to successive location convergences for the mobiles. In the example, the convergence of the mobiles at the users' similar work location becomes less significant over the course of the day. However, a change from a location convergence to a location divergence provides significant information as does successive location divergences. Using the same example again, if one user goes home after work but the other does not, then this divergence and the successive divergences provides significant information because the divergences indicate the phones are in different locations. The algorithm, therefore, becomes increasingly confident that different persons carry the mobiles.

Here is an exemplary algorithm for determining a confidence score according to the principles of the invention that can be carried out in mobile alias analysis system 213:

1. In case of the first of the series of convergence set a confidence score to an initial high value, which is less than 1 (0.5 for example). This value is added to the overall comparison weight for this pair of compared mobiles.

2. For a successive convergence, the confidence weight due to this convergence is damped by a factor (2 for example). So, if the earlier confidence was 0.5, the new convergence confidence weight due to a successive convergence is 0.5/2=0.25. This gets added to the overall comparison weight.

3. In case of the first of the series of divergence, the divergence weight is set to an initial divergence confidence value, which is a negative value (−0.1 for example). This is added to the overall comparison weight.

4. In case of successive divergences, the divergence weight for this divergence is set at the earlier divergence weight minus some percentage of the earlier divergence weight. In one example, the new divergence weight is the previous divergence weight minus 50% of the previous divergence weight. For an initial divergence weight of −0.1, the successive divergence weight will be −0.1−0.05=−0.15. This divergence weight is added to the overall comparison weight.

The comparison weight can be calculated over a selectable period. Multiple candidate mobiles can be compared to a known mobile. Once all candidate mobiles are compared to a known mobile, they are sorted in descending order of overall comparison weight. The ones with higher weight are considered mobiles that have higher probability of being used by the user along with the known mobile phone.

A person having ordinary skill in the art after reading this disclosure will understand that the filtering algorithm can be used in connection with the mobile alias analysis logic disclosed herein. In aspects of the invention, the mobile alias analysis engine processes location data and historical location data. Optionally, the above comparison algorithm can be used to compare mobiles using location data. A person having ordinary skill in the art after reading this disclosure will understand that the location data comparison algorithm can be used in connection with other processes designed to identify similar behavior between mobiles and that the algorithm is not limited to the mobile alias analysis disclosed herein.

It will be clear to those having ordinary skill in the art, after reading the present disclosure, how to make and use alternative embodiments wherein those operations described herein are used in conjunction or used as separate processes in different embodiments of a mobile data analysis system or process. For example, embodiments of the spatial subset analysis, mobility profile generation and matching profile algorithm, or location comparison algorithm can be used in conjunction or as processes in alternative data processing systems. All such alternative embodiments are within the described aspects of the invention.

What is claimed is:

1. A method for comparing the location of a first mobile to the location of a second mobile comprising:
    for a time interval, determining instances when a first mobile and a second mobile share a common location;
    assigning a confidence factor to a first instance of the first mobile and the second mobile sharing the common location;
    adding the confidence factor to a comparison score;
    for each successive instance of the first mobile and the second mobile sharing the common location, reducing the confidence factor;
    adding the reduced confidence factor to the comparison score;
    calculating a comparison score total for the second mobile; and
    establishing a comparison score threshold for inferring the second mobile is an alias of the first mobile and inferring the second mobile is an alias of the first mobile when the comparison score exceeds the threshold.

2. The method of claim 1 further comprising:
    for the time interval, determining instances when a first mobile and a second mobile occupy different locations;
    assigning a divergence factor to a first instance of the first mobile and the second mobile occupying different locations;
    adding the divergence factor to the comparison score;
    for each successive instance of the first mobile and the second mobile occupying different locations, increasing a magnitude of the divergence factor; and adding the increased divergence factor to the comparison score.

3. The method of claim 1 further comprising:
repeating the steps of claim 1 for the first mobile and a plurality of second mobiles;
for each second mobile, associating the second mobile with the second mobile's calculated comparison score total; and
sorting the plurality of second mobiles according to comparison score totals.

4. The method of claim 1 wherein the determining further comprises determining every T seconds in the time interval.

5. The method of claim 2 wherein the determining further comprises determining every T seconds in the time interval.

6. A method for inferring whether the second mobile is an alias of the first mobile according to the method of claim 1 further comprising:
comparing a first call pattern behavior of the first mobile to the a second call pattern behavior of the second phone;
increasing the comparison score when the first call pattern behavior is sufficiently similar to the second call pattern behavior.

7. The method of claim 6 further comprising decreasing the comparison score when the first call pattern behavior is sufficiently different from the second call pattern behavior.

8. A method for selecting a plurality of candidate phones for mobile alias analysis according to claim 3, further comprising:
establishing a geofence;
identifying a plurality of second mobiles within the geofence; and
selecting the plurality of candidate phones from the plurality of second mobiles.

9. A system comprising:
a processor for:
determining instances when a first mobile and a second mobile share a common location over a time interval;
assigning a confidence factor to a first instance of the first mobile and the second mobile sharing the common location;
adding the confidence factor to a comparison score;
for each successive instance of the first mobile and the second mobile sharing the common location, reducing the confidence factor;
adding the reduced confidence factor to the comparison score;
calculating a comparison score total for the second mobile; and
establishing a comparison score threshold for inferring the second mobile is an alias of the first mobile and inferring the second mobile is an alias of the first mobile when the comparison score exceeds the threshold.

10. The system of claim 9 further comprising a wireless location system for determining locations of the first and second mobile.

11. The system of claim 10 further comprising a data store accessible to the processor and operable to store the locations.

12. A mobile alias analysis system comprising the processor of claim 9, the processor further operable to compare the call pattern behavior of the first mobile to the call pattern behavior of the second mobile.

13. The processor of claim 9 further operable to establish a geofence around a definable geographic location; and
to identify a plurality of second mobiles within the geofence.

14. The processor of claim 9 wherein the processor is further operable to:
for the time interval, determine instances when a first mobile and a second mobile occupy different locations;
assign a divergence factor to a first instance of the first mobile and the second mobile occupying different locations;
add the divergence factor to the comparison score;
for each successive instance of the first mobile and the second mobile occupying different locations, increase a magnitude of the divergence factor;
add the increased divergence factor to the comparison score; and
infer that the second mobile is an alias of the first mobile using the comparison score value.

* * * * *